United States Patent
Dhanekula et al.

(10) Patent No.: US 8,442,779 B2
(45) Date of Patent: May 14, 2013

(54) IDENTIFYING DEGRADED FANS IN DATACENTERS

(75) Inventors: Ramakrishna C. Dhanekula, San Diego, CA (US); Kenneth C. Gross, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 273 days.

(21) Appl. No.: 12/748,705

(22) Filed: Mar. 29, 2010

(65) Prior Publication Data

US 2011/0238328 A1    Sep. 29, 2011

(51) Int. Cl.
*G01B 5/30*    (2006.01)
(52) U.S. Cl.
USPC .................. 702/39; 702/34; 702/35; 702/59; 702/66; 702/75; 702/76
(58) Field of Classification Search .................... 702/39, 702/34–35
See application file for complete search history.

(56) References Cited

U.S. PATENT DOCUMENTS

| | | | | | |
|---|---|---|---|---|---|
| 3,315,522 | A | * | 4/1967 | Frarey et al. | 73/659 |
| 4,352,293 | A | * | 10/1982 | Kurihara et al. | 73/593 |
| 4,639,191 | A | * | 1/1987 | Hart et al. | 415/196 |
| 5,210,704 | A | * | 5/1993 | Husseiny | 702/34 |
| 5,519,337 | A | * | 5/1996 | Casada | 324/765.01 |
| 6,098,022 | A | * | 8/2000 | Sonnichsen et al. | 702/35 |
| 7,877,167 | B1 | * | 1/2011 | Patel et al. | 700/280 |
| 2002/0083772 | A1 | * | 7/2002 | Sonnichsen et al. | 73/660 |
| 2003/0007861 | A1 | * | 1/2003 | Brooks et al. | 415/26 |
| 2005/0087016 | A1 | * | 4/2005 | Gilmore et al. | 73/579 |
| 2005/0209740 | A1 | * | 9/2005 | Vann | 700/300 |
| 2007/0056376 | A1 | * | 3/2007 | King | 73/660 |
| 2007/0089011 | A1 | * | 4/2007 | Dodeja et al. | 714/742 |
| 2010/0217543 | A1 | * | 8/2010 | Bougaev et al. | 702/56 |

FOREIGN PATENT DOCUMENTS

WO    WO9205437    *    4/1992

* cited by examiner

*Primary Examiner* — Mischita Henson
(74) *Attorney, Agent, or Firm* — Brooks Kushman P.C.

(57) ABSTRACT

A method for identifying a degraded fan measures acoustic data from an operating datacenter fan. A motor rotation frequency and a vane passing frequency are determined from the acoustic data. Amplitudes of the frequencies are determined from the acoustic data. If the amplitude of the motor rotation frequency is greater than the amplitude of the vane passing frequency, then it is determined that the fan is degraded.

20 Claims, 4 Drawing Sheets

Acoustic Spectrum for Good Fans

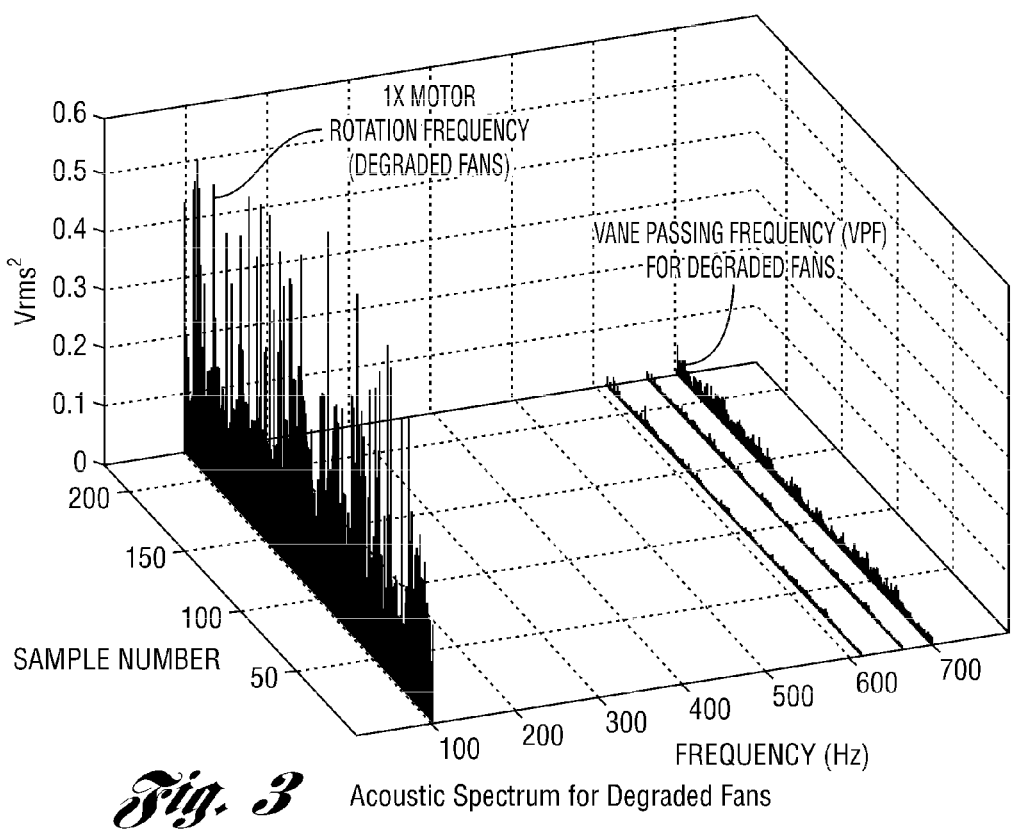
Fig. 3  Acoustic Spectrum for Degraded Fans
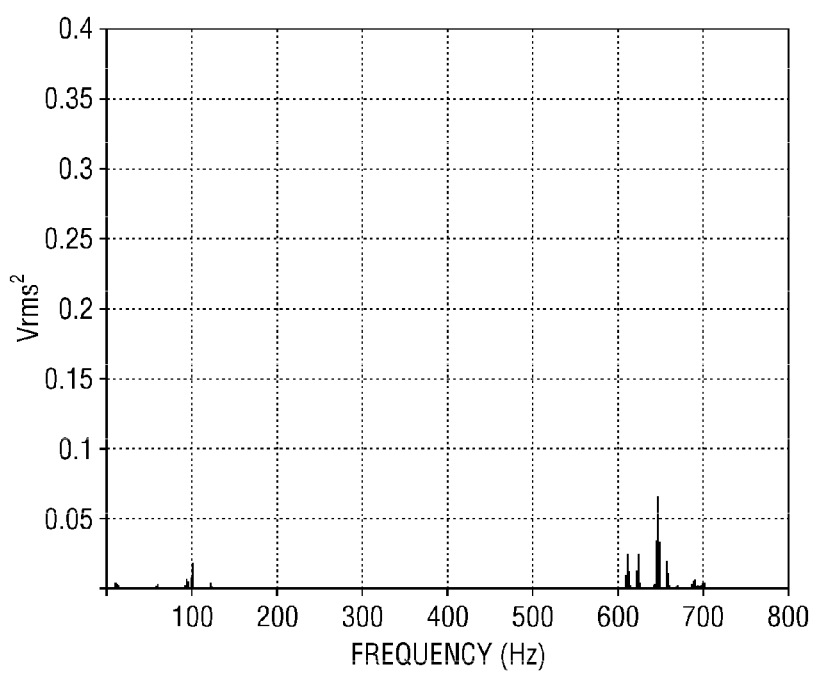
Fig. 4  Acoustic Spectrum for Good Fans Acoustic Spectrum for Degraded Fans

US 8,442,779 B2

IDENTIFYING DEGRADED FANS IN DATACENTERS

TECHNICAL FIELD

Various embodiments relate to methods, systems and software for identifying a degraded fan in a datacenter.

BACKGROUND

Datacenters have hardware, such as servers, hard disk drives, power supply units, and the like, that are air cooled. Multiple fans are often employed for cooling the associated hardware. Fan failure may result in failure of the associated hardware. Fans are field replaceable units (FRUs) that are frequently replaced in datacenters. The frequency of fan replacement is typically second only to hard disk drives, but not because hard disk drives are less reliable; rather, because there are many more hard disk drives in the systems than there are fans.

Because mechanical fans are high replacement units, most server products are designed so that the fans can be replaced in the field. If the fans fail completely, a field service engineer can typically visually detect which fan, or fan within a fan tray, has failed, thereby allowing the service engineer to replace the failed fan or fan tray. However, if a fan is experiencing degradation, but is still operational, it is extremely difficult to detect or undetectable by service engineers and customer datacenters. Often, fans that are suspected of potential degradation are removed from customer machines, replaced, shipped to a testing laboratory and tested in an attempt to distinguish degrading fans from undegraded fans. The testing involves putting the fans into an instrumented flow chamber to detect a difference in flow rate, typically by cubic feet per minute (CFM); and the performance is compared with normal, undegraded fans. Such testing is very costly.

It is difficult to distinguish degrading fans from undegraded fans in customer datacenters. Therefore, when a known degradation mode starts to appear for a given model of fans, it is typical for the system vendor to perform a worldwide recall. Such recalls have been launched when less than ten percent of the fans are effected by the degradation mode, simply because it is not detectable for field service engineers to distinguish degrading fans from undegraded fans. Such recalls can be extremely costly, even when the field replaceable units are only the fans. Power supply units are often deployed with internal fans that are not replaceable in the field. Therefore, during recalls, or during fan repair and/or replacement, the power supply units are replaced at substantial additional costs.

SUMMARY

In at least one embodiment, a method for identifying a degraded fan measures acoustic data from an operating datacenter fan. A motor rotation frequency and a vane passing frequency of the fan are determined from the acoustic data. Amplitudes of the frequencies of the fan are determined from the acoustic data. If the amplitude of the motor rotation frequency is greater than the amplitude of the vane passing frequency, it is determined that the fan is degraded.

At least another embodiment provides a system for identifying a degraded fan with an acoustic measuring device. A controller is in communication with the acoustic measuring device for measuring acoustic data from an operating datacenter fan. A motor rotation frequency and a vane passing frequency of the fan are determined from the acoustic data. Amplitudes of the frequencies of the fan are determined from the acoustic data. If the amplitude of the motor rotation frequency is greater than the amplitude of the vane passing frequency, it is determined that the fan is degraded.

In at least another embodiment, a computer readable medium is provided with computer readable instructions for measuring acoustic data from an operating datacenter fan. A motor rotation frequency and a vane passing frequency of the fan are determined from the acoustic data. Amplitudes of the frequencies of the fan are determined from the acoustic data. If the amplitude of the motor rotation frequency is greater than the amplitude of the vane passing frequency, it is determined that the fan is degraded. Instructions are issued to replace the degraded fan.

According to at least one embodiment, a method for identifying a degraded fan measures acoustic data from an operating datacenter fan. Amplitudes of frequencies measured from the acoustic data are identified. A peak amplitude of the frequencies measured from the acoustic data is identified. The frequency of the peak amplitude is compared with frequency data for predicted undegraded fans. If the frequency of the peak amplitude is not within a predetermined tolerance to a frequency for predicted undegraded fans, it is determined that the fan is degraded.

At least another embodiment provides a system for identifying a degraded fan with an acoustic measuring device. A controller is in communication with the acoustic measuring device for measuring acoustic data from an operating datacenter fan. Amplitudes of frequencies measured from the acoustic data are identified. A peak amplitude of the frequencies measured from the acoustic data is identified. The frequency of the peak amplitude is compared with frequency data for predicted undegraded fans. If the frequency of the peak amplitude is not within a predetermined tolerance to a frequency for predicted undegraded fans, it is determined that the fan is degraded.

In at least another embodiment, a computer readable medium is provided with computer readable instructions for measuring acoustic data from an operating datacenter fan. Amplitudes of frequencies measured from the acoustic data are identified. A peak amplitude of the frequencies measured from the acoustic data is identified. The frequency of the peak amplitude is compared with frequency data for predicted undegraded fans. If the frequency of the peak amplitude is not within a predetermined tolerance to a frequency for predicted undegraded fans, it is determined that the fan is degraded. Instructions are issued to replace the degraded fan.

According to at least one embodiment, a method for identifying a degraded fan measures acoustic data from an operating datacenter fan. Amplitudes of frequencies measured from the acoustic data are identified. A peak amplitude of the frequencies measured from the acoustic data is identified. The frequencies of the amplitudes are compared with frequency data from predicted undegraded fans. If the frequency of one of the amplitudes is within a predetermined tolerance to a frequency for predicted undegraded fans, a ratio of the amplitude of the frequency that is within the predetermined tolerance for a predicted undegraded fan, to the peak amplitude is determined. If the ratio is less than one, it is determined that the fan is degraded.

At least another embodiment provides a system for identifying a degraded fan with an acoustic measuring device. A controller is in communication with the acoustic measuring device for measuring acoustic data from an operating datacenter fan. Amplitudes of frequencies measured from the acoustic data are identified. A peak amplitude of the frequencies measured from the acoustic data is identified. The frequencies of the amplitudes are compared with frequency data from predicted undegraded fans. If the frequency of one of the amplitudes is within a predetermined tolerance to a frequency for predicted undegraded fans, a ratio of the amplitude of the frequency that is within the predetermined tolerance for a predicted undegraded fan, to the peak amplitude is determined. If the ratio is less than one, it is determined that the fan is degraded.

In at least another embodiment, a computer readable medium is provided with computer readable instructions for measuring device for measuring acoustic data from an operating datacenter fan. Amplitudes of frequencies measured from the acoustic data are identified. A peak amplitude of the frequencies measured from the acoustic data is identified. The frequencies of the amplitudes are compared with frequency data from predicted undegraded fans. If the frequency of one of the amplitudes is within a predetermined tolerance to a frequency for predicted undegraded fans, a ratio of the amplitude of the frequency that is within the predetermined tolerance for a predicted undegraded fan, to the peak amplitude is determined. If the ratio is less than one, it is determined that the fan is degraded. Instructions are issued to replace the degraded fan.

BRIEF DESCRIPTION OF THE DRAWINGS

FIG. 3 is a three-dimensional graph of an acoustic spectrum for degraded fans;

FIG. 4 is a two-dimensional graph of the acoustic spectrum of undegraded fans;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis teaching one skilled in the art to variously employ the present invention.

A degraded fan experiences various common mechanical degradation modes for server fans. Some of these degradation modes include bearing wear, radial imbalance of a shaft, lubrication dry out, dust contamination, motor degradation, and the like. Such mechanical degradation modes affect the acoustic resonance spectrometry for the fan, which may be detected and analyzed for identifying a degraded fan.

Figure 1:
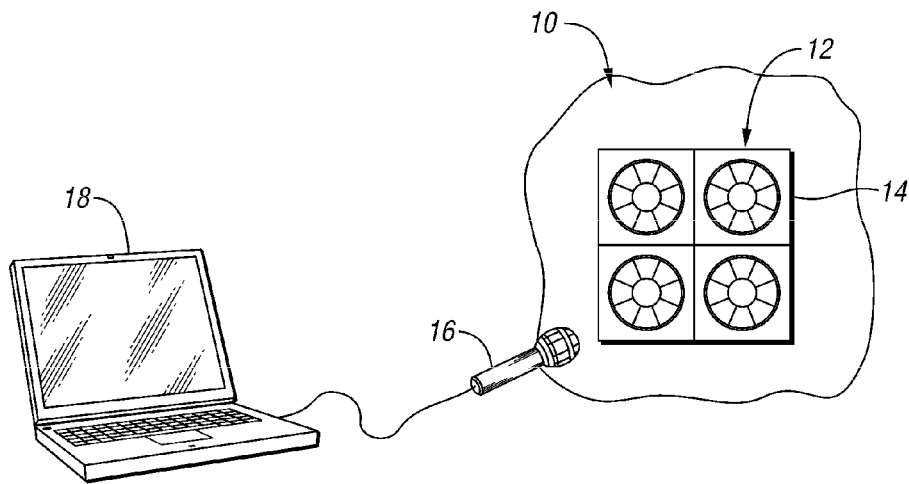
FIG. 1 is a schematic view of fans in a datacenter and acoustic resonance spectrometry equipment in accordance with embodiments of the invention.

Referring now to FIG. 1, an enterprise datacenter is illustrated schematically and referenced by numeral 10. The datacenter 10 includes a fan assembly tray 12, which includes a plurality of axially infeed fans 14 for cooling associated hardware in the datacenter 10, such as servers, hard disk drives or power supply units. The acoustic resonance spectrometry for the fans 14 can be measured and analyzed by utilizing an acoustic measuring device, such as a microphone 16 connected to a portable electronic device such as a laptop computer 18. Although a laptop 18 is illustrated, the invention contemplates any portable electronic device, such as a notebook, a handheld PDA, a cell phone, or the like. Although the microphone 16 is illustrated separate from the laptop 18, the invention contemplates that the microphone 16 may be provided by the portable electronic device, since microphones are commonly provided in laptops, cell phones, PDAs, and the like.

The acoustic spectrum can be computed with a standard fast fourier transform, which may take a sample reading every five seconds. The vibration performance of fans 14 is dominated by the rotational speed of the fan motors. The acoustic performance is dominated by the vane passing frequency for the fans 14. Acoustic spectrum in the vicinity of datacenters, show distinct peaks for both the frequency of motor rotation and the vane passing frequency. For fans 14 with no mechanical degradation, the vane passing frequency exhibits amplitudes several times larger than the rotation frequency for the motor. For degraded fans 14, this ratio is reversed. For degraded fans 14, the amplitude associated with the motor rotation frequency is several times higher than the amplitude associated with the vane passing frequency.

Figure 2:
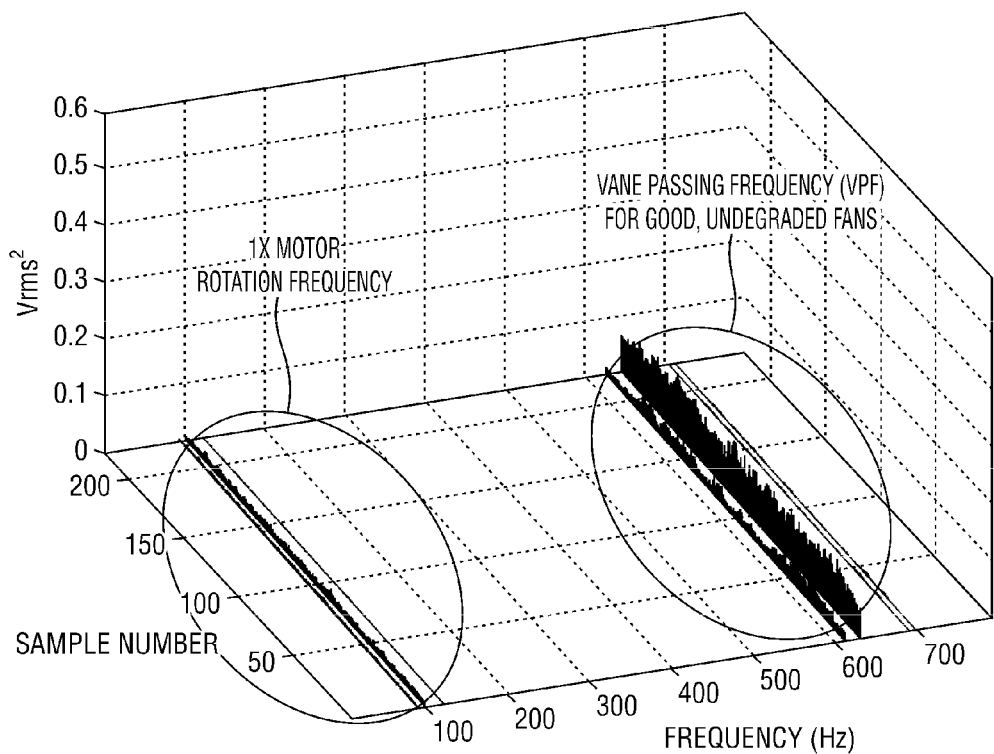
FIG. 2 is a three-dimensional graph of an acoustic spectrum for undegraded fans.

Referring now to FIG. 2, the acoustic spectrum for an undegraded fan 14 is illustrated. The measured frequencies are graphed in one abscissa and are measured in hertz for example. Of course, the frequency can be measured in any suitable unit. The amplitude of acoustic readings are graphed in the ordinate and are measured in voltage of the root mean square squared ($V_{rms}^2$). Of course, the amplitude can be measured in any suitable unit, such as decibels. The other abscissa depicts the sample number. The acoustic spectrum graphed in FIG. 2 is for a typical enterprise server, which employs fans 14 that have seven vanes. The vane passing frequency is seven times greater than the motor rotation frequency due to the seven vanes and therefore the vane passing frequency is identified as the higher frequency, wherein the motor rotation frequency is identified as the lower frequency. Note that the 1× motor rotation frequency is 1/7 of the vane passing frequency. Since the amplitude of the peaks of the motor rotation frequency is less than the vane passing frequency, the fans 14 for the server are undegraded and no repair or replacement is required.

FIG. 3 shows the acoustic spectrum graphed on similar coordinates for a system from an escalated datacenter in which the fans 14 have degraded in service. The amplitude associated with the vane passing frequency has not changed. However, the amplitude of the motor rotation frequency is much greater than the amplitude of the vane passing frequency, by a factor of ten or greater. Based on the amplitudes, it is determined that the server has at least one degraded fan 14.

Figure 5:
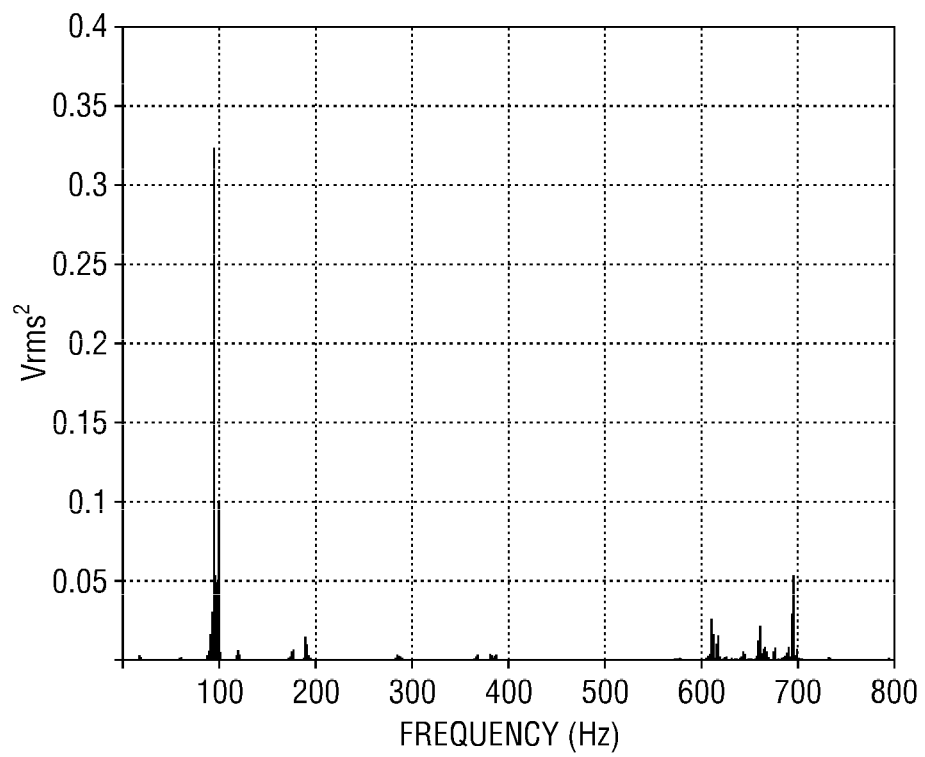
FIG. 5 is a two-dimensional graph of the acoustic spectrum for degraded fans.

FIG. 4 illustrates a two-dimensional representation of the acoustic spectrum of FIG. 2, illustrating just the frequency and amplitude. The greater frequency, between 600 and 700 hertz in FIG. 4 is the vane passing frequency and has a higher amplitude than that of the motor rotation frequency and therefore illustrates no fan degradation. FIG. 5 illustrates the two-dimensional data for the acoustic spectrum of FIG. 3. The smaller frequency, approximately ninety hertz, has a much larger amplitude than the higher frequency of the vane passing frequency, and therefore illustrates an indication that the motor is degraded.

Commercial fans 14 used in enterprise servers and in power supply units have a number of vanes, which can be measured in integers, typically 3 to 7 vanes. This relationship is utilized for creating a systematic unambiguous heuristic for identifying degraded fans 14. A sample method of a suitable algorithm is illustrated in the flow chart of FIG. 6. Beginning at block 30, acoustic data is measured from a plurality of operating datacenter fans 14. Although a plurality of fans 14 is illustrated and described, the invention contemplates analyzing any number of fans 14, such as one fan 14.

At block 32, a peak amplitude of a frequency is measured from the acoustic data. At decision block 34, it is determined whether any measured frequencies fall within a predetermined tolerance of an integer fraction of the peak amplitude frequency. In other words, the algorithm examines peak amplitudes in the vicinity of integer fractions of the peak amplitude. For example, the peak amplitude frequency should be the vane passing frequency for undegraded fans 14. Therefore, the algorithm looks at integer fractions of that frequency, such as one-half of the frequency, one-third of the frequency, one-fourth of the frequency, etc. The denominator is an integer associated with a possible number of fan blades. The algorithm may test for integers within a certain range, for example two to seven, for two to seven vanes. Typically most datacenter fans 14 have three to seven vanes. Of course, the algorithm is suitable for identifying fan degradation for any number of fan vanes.

When a peak amplitude is identified that is within a predetermined tolerance of one of the fractions, that frequency is identified as a motor rotation frequency in block 36. The predetermined tolerance may be any suitable tolerance. Based on empirical data, it has been found that a tolerance of two percent is suitable for identifying the motor rotation frequency. At block 38, the original peak amplitude frequency is identified as the vane passing frequency. Thus, for the seven vane fans 14 of FIG. 4, the peak amplitude frequency of approximately 650 hertz would be multiplied by integer fractions of one-half, one-third, etc. until multiplied by one-seventh, at which point a peak would have been identified within the tolerance around approximately 95 hertz. Therefore, the measured frequency of 95 hertz would be identified as the motor rotation frequency and the peak amplitude frequency of 650 hertz would be identified as the vane passing frequency.

Figure 6:
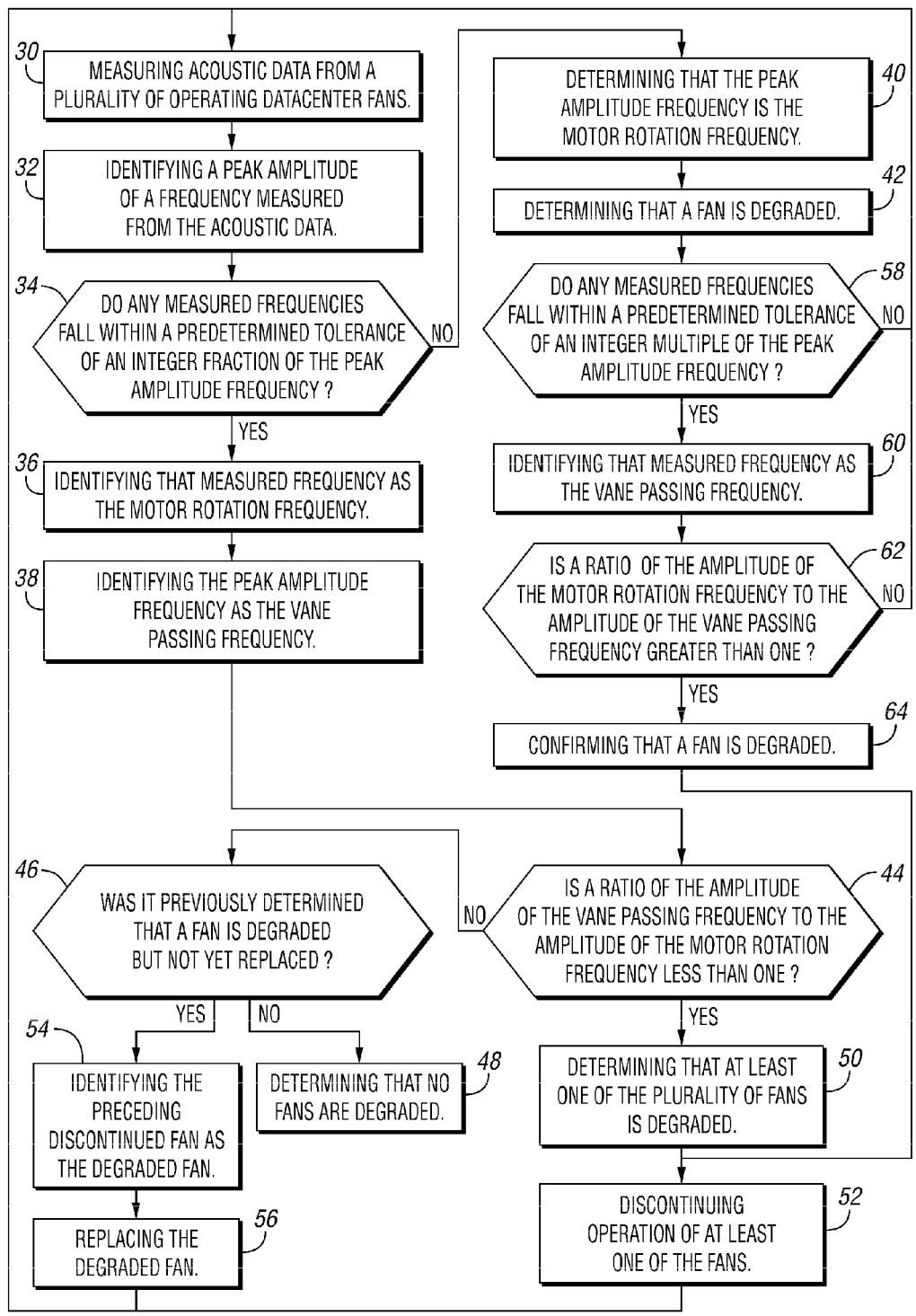
FIG. 6 is a flow chart illustrating various methods for identifying a degraded fan according to various embodiments.

Applying method blocks 34 to 38 of the flow chart of FIG. 6 to the acoustic spectrum of FIG. 5, the peak amplitude frequency is at approximately ninety hertz; and the examination of integer fractions of ninety hertz would not identify any measured frequencies. Therefore, at block 40, it would be determined that the peak amplitude frequency of ninety hertz is a motor rotation frequency. At block 42 it would be determined that a fan 14 is degraded.

Referring back to decision block 34 in FIG. 6, when a measured frequency falls within the predetermined tolerance of an integer fraction of the peak amplitude frequency, the frequencies are identified in blocks 36, 38. Then a ratio of the amplitude of the vane passing frequency to the amplitude of the motor rotation frequency is determined at decision block 44. In other words, it is determined whether the amplitude of the vane passing frequency is greater than the amplitude of the motor rotation frequency. If the ratio is greater than one, it is determined at decision block 46 whether a fan 14 within the applicable fan tray 12 or server or power supply unit was previously identified as degraded but not yet replaced. If not, at block 48 it is determined that no fans 14 are degraded as in FIGS. 2 and 4, and the testing is complete.

Referring again to decision block 44, if the ratio of the amplitude of the vane passing frequency to the amplitude of the motor rotation frequency is less than one, then one or more fans 14 for that server are degraded at block 50. The fan tray 12 can be replaced for the server, or the fans 14 can be replaced one at a time and the acoustic resonance spectrometry test can be repeated. At block 52, the operation of at least one of the fans 14 is discontinued and a new measurement is taken at block 30. A peak amplitude of a frequency is identified at block 32. If a measured frequency falls within a predetermined tolerance of an integer fraction of the peak amplitude frequency at block 34, that measured frequency is identified as the motor rotation frequency at 36. The peak amplitude frequency is identified as the vane passing frequency of block 38. If the ratio of the amplitude of the vane passing frequency to the amplitude of the motor rotation frequency is less than one, then a degraded fan 14 is still operating at block 50. At block 52 the operation of another fan 14 would be discontinued and these steps may be repeated again at block 30.

However, if the ratio of the amplitude of the vane passing frequency to the amplitude of the motor rotation frequency is greater than one, then at block 46 it is determined that a fan 14 was previously identified as degraded but not yet replaced. Therefore, at block 54, the preceding discontinued fan 14 is identified as the degraded fan 14 and is replaced at block 56. In order to determine whether the replaced degraded fan 14 was the only degraded fan 14 within the measured fans 14, the fans 14 are operated again and remeasured at block 30 and the above described steps are repeated until block 48 is reached wherein it is determined that no fans 14 are degraded.

For the acoustic spectrum of FIGS. 3 and 5, the peak amplitude frequency is the motor rotation frequency as determined at block 40 in the flowchart of FIG. 6. Block 42 determines that a fan 14 is degraded. At block 58 it is determined whether any measured frequencies fall within a predetermined tolerance of an integer multiple of the peak amplitude frequency. It has been determined from empirical data that a tolerance for integer multiple frequencies can be within two percent. Of course, any suitable tolerance can be applied. The frequency of approximately ninety hertz is multiplied by integers until the integer seven is applied resulting in an examination of frequencies within the range of approximately 617 hertz to 643 hertz. A peak amplitude is provided within this range and therefore is identified as a vane passing frequency at block 60. If no measured frequencies fall within a predetermined tolerance of an integer multiple of the peak amplitude frequency at block 58, the measurements are retaken at block 30.

After the measured frequency is identified as the vane passing frequency at block 60, a ratio of the amplitude of the motor rotation frequency to the amplitude of the vane passing frequency is determined at block 62. If that ratio is greater than one, it is confirmed at block 64 that a fan 14 is degraded. At block 52, operation of at least one of the fans 14 is discontinued and measurements are retaken at block 30 and steps are repeated until the degraded fan 14 is identified at block 54 and replaced at block 56. Then, the measurements are repeated to determine if there are any other degraded fans 14 and the steps are repeated until block 48 is reached with a determination that no degraded fans 14 are remaining.

Referring again to decision block 62, if the ratio of the amplitude of the motor rotation frequency to the amplitude of the vane passing frequency is less than one, then block 30 is repeated to measure new acoustic data.

Data centers and their associated products such as servers and power supply units are typically air cooled. The above-identified algorithms eliminate the need to create, store, and update a large library of all known fans 14 used in server products, including fan-speed ranges, and the number of vanes per fan 14 for those models. The algorithm extracts data from the fans 14 themselves and compares that data for identifying if a fan 14 is degraded.

The various methods depicted in the flowchart of FIG. 6 can be employed in maintenance for proactive repair and replacement of degrading fans. The methods can be incorporated in a system as depicted in FIG. 1. The methods can also be provided in software that can be provided in a portable electronic device as depicted by the laptop 18 in FIG. 1.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for identifying a non-degraded fan, comprising steps of:
   measuring acoustic data from an operating datacenter fan;
   identifying a peak amplitude of a frequency measured from the acoustic data;
   determining if any measured frequencies fall within a predetermined tolerance of an integer fraction of the peak amplitude frequency, wherein the integer fraction comprises the inverse of any integer greater than one;
   if any measured frequencies fall within the predetermined tolerance of the integer fraction of the peak amplitude frequency, identifying that measured frequency as the motor rotation frequency; and
   if any measured frequencies fall within the predetermined tolerance of the integer fraction of the peak amplitude frequency, identifying the peak amplitude frequency as the vane passing frequency.

2. The method of claim 1 further comprising steps of:
   determining a motor rotation frequency and a vane passing frequency of the fan from the acoustic data;
   determining amplitudes of the frequencies of the fan from the acoustic data;
   identifying the greater frequency as the vane passing frequency;
   identifying the lesser frequency as the motor rotation frequency; and
   if the amplitude of the motor rotation frequency is greater than the amplitude of the vane passing frequency, then determining that the fan is degraded.

3. The method of claim 2 further comprising a step of, if the amplitude of the motor rotation frequency is less than the amplitude of the vane passing frequency, then determining that the fan is not degraded.

4. A system for identifying a degraded fan comprising:
   an acoustic measuring device; and
   a controller in communication with the acoustic measuring device for performing the method of claim 2.

5. A non-transitory computer readable medium having computer executable instructions for:
   performing the method of claim 2; and
   issuing instructions to replace the degraded fan.

6. The method of claim 2 further comprising a step of replacing the degraded fan.

7. The method of claim 1 wherein the predetermined tolerance comprises at least two percent.

8. The method of claim 1 wherein the integer fraction comprises the inverse of integers from three to seven.

9. The method of claim 1 further comprising the steps of:
   determining a ratio of the amplitude of the vane passing frequency to the amplitude of the motor rotation frequency; and
   if the ratio is greater than one, determining that the fan is not degraded.

10. A method for identifying a degraded fan, comprising steps of:
    measuring acoustic data from an operating datacenter fan;
    identifying a peak amplitude of a frequency measured from the acoustic data;
    determining if any measured frequencies fall within a predetermined tolerance of an integer fraction of the peak amplitude frequency;
    if no measured frequencies fall within the predetermined tolerance of an integer fraction of the peak amplitude frequency, determining that the peak amplitude frequency is the motor rotation frequency;
    determining that the fan is degraded;
    if no measured frequencies fall within the predetermined tolerance of an integer fraction of the peak amplitude frequency, determining if any measured frequencies fall within a predetermined tolerance of an integer multiple of the peak amplitude frequency;
    if any measured frequencies fall within the predetermined tolerance of an integer multiple of the peak amplitude frequency, identifying that measured frequency as the vane passing frequency;
    determining a ratio of the amplitude of the motor rotation frequency to the amplitude of the vane passing frequency; and
    if the ratio is greater than one, confirming that the fan is degraded.

11. The method of claim 10 further comprising steps of:
    determining a motor rotation frequency and a vane passing frequency of the fan from the acoustic data;
    determining amplitudes of the frequencies of the fan from the acoustic data;
    identifying the greater frequency as the vane passing frequency;
    identifying the lesser frequency as the motor rotation frequency; and
    if the amplitude of the motor rotation frequency is greater than the amplitude of the vane passing frequency, then determining that the fan is degraded.

12. The method of claim 11 further comprising a step of, if the amplitude of the motor rotation frequency is less than the amplitude of the vane passing frequency, then determining that the fan is not degraded.

13. The method of claim 10 wherein the predetermined tolerance comprises at least two percent.

14. The method of claim 10 wherein the integer fraction comprises the inverse of any integer greater than one.

15. The method of claim 10 wherein the integer fraction comprises the inverse of integers from three to seven.

16. The method of claim 10 further comprising the steps of:
    determining a ratio of the amplitude of the vane passing frequency to the amplitude of the motor rotation frequency; and
    if the ratio is greater than one, determining that the fan is not degraded.

17. A system for identifying a degraded fan comprising:
    an acoustic measuring device; and
    a controller in communication with the acoustic measuring device for performing the method of claim 10.

18. A non-transitory computer readable medium having computer executable instructions for:
  performing the method of claim 10; and
  issuing instructions to replace the degraded fan.

19. A method for identifying a degraded fan, comprising steps of:
  measuring acoustic data from a plurality of operating datacenter fans;
  identifying a peak amplitude of a frequency measured from the acoustic data;
  determining if any measured frequencies fall within a predetermined tolerance of an integer fraction of the peak amplitude frequency;
  if any measured frequencies fall within the predetermined tolerance of an integer fraction of the peak amplitude frequency, identifying that measured frequency as the motor rotation frequency;
  if any measured frequencies fall within the predetermined tolerance of an integer fraction of the peak amplitude frequency, identifying the peak amplitude frequency as the vane passing frequency;
  determining a ratio of the amplitude of the vane passing frequency to the amplitude of the motor rotation frequency;
  if the ratio is less than one, determining that at least one of the plurality of fans is degraded;
  if it is determined that one of the plurality of fans is degraded, discontinuing operation of at least one of the fans;
  if it is determined that one of the plurality of fans is degraded, repeating all preceding steps until the ratio is greater than one; and
  if the ratio is greater than one, identifying the preceding discontinued fan as the degraded fan.

20. The method of claim 19 further comprising steps of:
  replacing the degraded fan; and
  repeating all preceding steps.

* * * * *